United States Patent [19]
Ohnishi et al.

[11] Patent Number: 5,236,127
[45] Date of Patent: Aug. 17, 1993

[54] HUMIDIFIER

[75] Inventors: Norio Ohnishi, Hiroshima; Satoru Tanaka, Kure; Akio Shimizu, Hiroshima, all of Japan

[73] Assignee: H. Ikeuchi & Co., Ltd., Osaka, Japan

[21] Appl. No.: 867,603

[22] Filed: Jun. 12, 1992

[30] Foreign Application Priority Data

Sep. 21, 1991 [JP] Japan .................. 3-242156

[51] Int. Cl.⁵ .............................................. B01F 3/04
[52] U.S. Cl. ..................................... 239/346; 239/352; 239/369; 239/543; 261/78.2; 261/70
[58] Field of Search ............... 239/346, 352, 369, 543; 261/78.2, 70

[56] References Cited

U.S. PATENT DOCUMENTS

| | | | |
|---|---|---|---|
| 2,550,164 | 4/1951 | Rich | 239/352 |
| 3,062,231 | 11/1962 | Woods | 261/70 |
| 3,206,175 | 9/1965 | Boteler | 261/78.2 |
| 3,304,011 | 2/1967 | Paasche | 239/346 |
| 3,515,676 | 6/1970 | Hierta et al. | 261/78.2 |
| 3,661,172 | 5/1972 | Miller | 261/70 |
| 3,664,337 | 5/1972 | Lindsey et al. | 261/78.2 |
| 3,915,384 | 10/1975 | Diggs | 239/543 |
| 4,268,461 | 5/1981 | Onishi et al. | 261/70 |
| 4,353,345 | 10/1982 | Ebihara | 261/70 |
| 4,783,008 | 11/1988 | Ikeuchi et al. | 239/543 |

FOREIGN PATENT DOCUMENTS 8223421 11/1982 Fed. Rep. of Germany .
2310536 12/1976 France .
57-33739 2/1982 Japan .

Primary Examiner—Tim Miles
Attorney, Agent, or Firm—Wenderoth, Lind & Ponack

[57] ABSTRACT

A humidifier comprises a liquid storing chamber provided in the lower portion of the casing. A nozzle is provided in the upper portion of the casing. An adaptor, provided in the upper portion of the casing, introduces compressed air and liquid into the nozzle. A liquid sucking pipe communicates with a liquid sucking opening of the adaptor and extends vertically downward to the vicinity of the bottom surface of the liquid storing chamber. A float is provided in the liquid storing chamber and is movable along the inner surface of the liquid storing chamber, depending on the amount of the liquid stored therein. A liquid cutoff lever is provided above the float and contacts the upper surface thereof. A liquid cutoff valve, of a liquid cutoff device mounted on the casing is operated by the liquid cutoff lever so that the capacity of the liquid to be controlled by the liquid cutoff valve is small, for example 30 cc.

10 Claims, 9 Drawing Sheets

HUMIDIFIER

BACKGROUND OF THE INVENTION

Field of the Invention

The present invention relates to a humidifier for spraying droplets periodically to keep the humidity of a room constant, and more particularly to a humidifier to be used when a predetermined humidity is required in agriculture, industry or the like.

Description of the Related Arts

A humidifier in accordance with the present invention prevents bacteria from being generated and breeding in water which is to be sprayed. Therefore the humidifier is preferably used to humidify a specific place, for example a clean room and rooms for growing orchids or mushrooms where bacteria should not be generated.

As described in Examined Japanese Utility Model Publication No. 55-10810, the application of which was filed by the present applicant, a certain amount of liquid is stored in a tank and air pressure is utilized to spray the mixture of liquid and air from a dual head nozzle mounted on the leading end of the humidifier.

As shown in FIGS. 11 and 12 herein, liquid supply pipe 2 and a compressed air supply pipe 3 project from a casing 1. A spraying nozzle 4 is mounted on the leading end of the compressed air supply pipe 3 at the inner side of the casing 1, and a conduit 5 for sucking liquid upward, the upper end of which is connected with the nozzle 4, is vertically provided in the casing 1. The lower portion of the casing 1, partitioned by a partitioning wall 6, serves as a water storing chamber 7. The conduit 5 opens at its lower end inside the water storing chamber 7. The liquid supply pipe 2 opens at its lower end inside the water storing chamber 7. With the increase of water in the water storing chamber 7, the opening thereof is moved upward by a circular water cutoff valve 9 operatively connected with a float 8 positioned inside the water storing chamber 7. Thus, the opening of the liquid supply pipe 2 is closed.

The capacity of the water storing chamber 7 of the above-described humidifier is comparatively small, while the capacities of water storing chambers and water storing tanks of other known humidifiers are very large. A water storing chamber and a water storing tank of a large capacity allow bacteria to be easily generated and to breed.

The temperature in the water storing tank of a ultrasonic wave type humidifier most widely used is approximately 30° C. which is suitable for bacteria to breed. Thus, there is a great possibility that the humidifier sprays vapor containing bacteria. A person who inhales vapor containing bacteria is liable to catch allergic pneumonia or infections.

It is known that the generation and breeding of bacteria can be completely prevented by the provision of a water storing chamber of a small capacity and by the constant supply of fresh water from water pipes.

As shown in FIG. 11, the humidifiers are hung at intervals in an upper portion of a room so that they spray droplets entirely in the room. To this end, the compressed air supply pipe 3 and the liquid supply pipe 2 are connected with a compressed air supply pipe 10 and a liquid (water) supply pipe 11 provided in upper portions of the room through a pipe 12 and a pipe 13, respectively. In addition, bands 14 and 15 are used to fasten the pipe 3 to the pipe 12 and the pipe 2 to the pipe 13, respectively.

This method for connecting the pipes with each other necessitates the removal of the humidifiers from the pipes 12 and 13 in order to perform maintenance, inspection, and liquid discharge. To this end, the supply of compressed air and liquid is required to be suspended. In addition, since the humidifiers are installed at high positions, they cannot be installed on the compressed air supply pipe 10 and the liquid supply pipe 11 or removed therefrom promptly. Thus, much time and labor are required for carrying out maintenance and inspection, which is disadvantageous when periodically inspecting and washing the humidifiers.

Since the humidifiers are installed on the compressed air supply pipe 10 and the liquid supply pipe 11 through the pipes 12 and 13, it is necessary to provide space for the pipes 10 and 11. In addition, the pipes 12 and 13 cause the humidifiers to be installed at a lower position.

Further, since the humidifiers are hung through the pipes 12 and 13 or through hoses, the stability of the humidifiers is not satisfactory.

As shown in FIG. 12, according to the above-described conventional humidifier, the liquid cutoff valve 9 is directly pressed upward by the float 8. Therefore, a great buoyancy is required, and the float is consequently required to be large, and thus the liquid storing chamber 7 is large.

Since the float 8 and the liquid cutoff valve 9 of the conventional humidifier are circular, the moving directions thereof are not stabilized, and thus the liquid cutoff valve 9 is liable to be pressed upward even when it is inclined. Thus, the liquid stopping valve 9 does not closely contact a valve seat accurately and liquid supply cannot be reliably stopped.

SUMMARY OF THE INVENTION

It is an object of the present invention to provide a humidifier having a liquid storing chamber the capacity of which is small so that atomized droplets are sprayed while water is being supplied from a liquid supply pipe connected with a water pipe.

It is another object of the present invention to provide a humidifier having a liquid storing chamber from which liquid can be discharged without removing the humidifier from a compressed air supply pipe and a liquid supply pipe so as to prevent the generation and breeding of bacteria.

It is still another object of the present invention to provide a humidifier which is directly installed on a compressed air supply pipe and removed therefrom with one touch. The humidifier may be hung as necessary.

It is a further object of the present invention to provide a humidifier which allows the removal of a liquid storing chamber and a nozzle therefrom without removing the entire humidifier from a compressed air supply pipe and a liquid supply pipe so that the maintenance and inspection of the liquid storing chamber and the nozzle can be accomplished. In removing the liquid storing chamber and the nozzle, compressed air can be automatically stopped without providing a mechanism for stopping the supply of compressed air.

It is a still further object of the present invention to provide a humidifier in which a compact float has great buoyancy so as to accomplish a liquid cutoff operation and contacts a valve seat at a predetermined position so that the liquid cutoff operation is reliably performed when the valve is closed.

It is a further object of the present invention to provide a humidifier having a plurality of nozzles facing various directions so that atomized droplets are sprayed in a greater amount and in a wider range.

In accomplishing these and other objects, there is provided a humidifier having a means for supplying compressed air and liquid to a nozzle mounted on a casing partitioned into an upper portion and a lower portion, sucking up liquid into the nozzle by means of the compressed air, and mixing the compressed air and the liquid with each other so as to generate atomized liquid. A liquid storing chamber is provided in the lower portion of the casing and a nozzle is provided in the upper portion of the casing. An adaptor, provided in the upper portion of the casing, is for introducing the compressed air and the liquid into the nozzle. A liquid sucking pipe communicating with a liquid sucking opening of the adaptor extends vertically downward to the vicinity of the bottom surface of the liquid storing chamber. A float is provided in the liquid storing chamber and is movable along the inner surface of the liquid storing chamber depending on the amount of the liquid stored therein. A liquid cutoff lever provided above the float contacts the upper surface thereof. A liquid cutoff valve of a liquid cutoff device mounted on the casing is operated by the liquid cutoff lever so that the capacity of the liquid to be controlled by the liquid cutoff valve is small, namely in the range from 10 to 50 cc.

The above-described casing comprises a first casing to be mounted on a pipe and a second casing serving as the main body of the casing. The first casing comprises a head member and a base member each opened and closed so that the humidifier can be directly mounted on a compressed air supply pipe sandwiched between the head member and the base member. The second casing can be removably mounted on the first casing by inserting a plurality of locking pins projecting from the upper end surface of the second casing into each mounting opening formed in the base member and rotating the locking pins.

An air intake member communicating with the compressed air supply pipe is installed inside the base member and communicates with the air sucking opening of the adaptor via a valve, so that the valve is opened by the insertion of the air sucking pipe of the adaptor into the air intake member and automatically closed by the pulling of the air sucking pipe.

The liquid sucking pipe extends vertically along the axis of the liquid storing chamber, and an axial opening movable along the liquid sucking pipe, is provided in the center of the float, so that the float moves vertically with the guidance of the liquid sucking pipe and the inner surface of the second casing.

The bottom surface of the casing is tapered downward to the center thereof and the liquid sucking pipe is opened at the center of the lowermost portion thereof so that the opening sucks liquid upward.

The liquid cutoff lever comprises a pair of members sandwiching the liquid sucking pipe and is positioned between projections of the liquid cutoff valve, regulated to linearly move in the horizontal direction inside the valve chamber. One end of the liquid cutoff lever contacts the upper surface of the float and is pivotally mounted on a cap of the liquid cutoff valve device and the other end thereof projects into the inside of a valve chamber of the liquid cutoff device and is linearly moved in the horizontal direction according to the pivotal motion of the liquid cutoff lever. A needle valve for opening and closing a liquid path formed in the needle valve is provided at the leading end of the liquid cutoff valve.

According to the above construction, since the liquid sucking pipe sucks liquid from the lowermost level in the liquid storing chamber, liquid can be stored therein in a small amount and can be intermittently supplied to the liquid storing chamber in a spraying operation. Therefore, the generation and breeding of bacteria can be prevented.

Necessary members can be installed on the humidifier and removed therefrom by one touch for maintenance and inspection.

BRIEF DESCRIPTION OF THE DRAWINGS

The above and other objects and features of the present invention will become apparent from the following description taken in conjunction with the preferred embodiments thereof with reference to the accompanying drawings, in which:

FIG. 6b is a sectional view of FIG. 6a;

FIG. 8b is a sectional view of FIG. 8a;

DETAILED DESCRIPTION OF THE INVENTION

Figure 1:
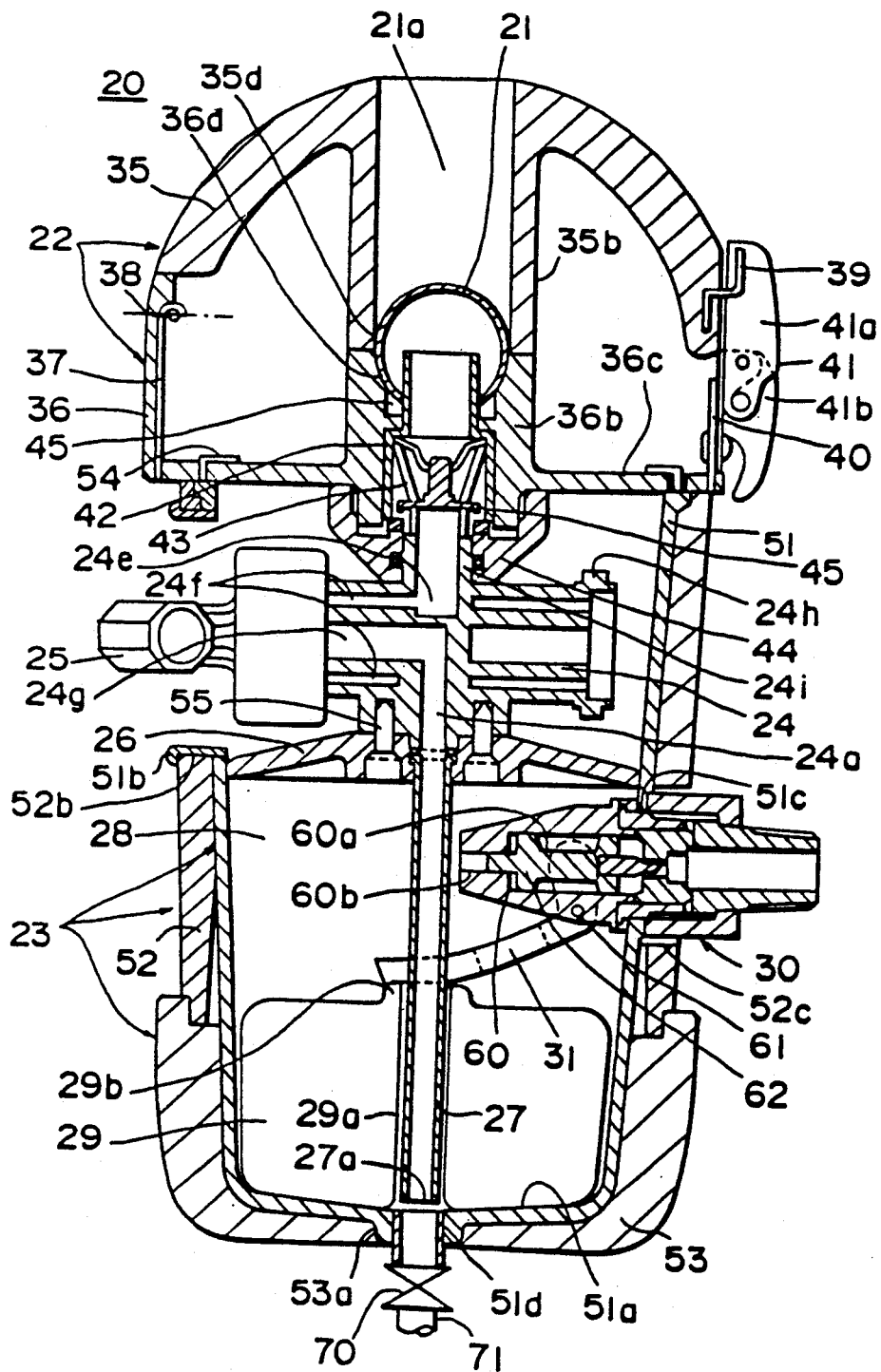
FIG. 1 is a vertical sectional view showing a humidifier according to the present invention.

Before the description of the present invention proceeds, it is to be noted that like parts are designated by like reference numerals throughout the accompanying drawings.

A humidifier according to an embodiment of the present invention will be described below with reference to accompanied drawings.

As shown in FIG. 1, the casing of a humidifier 20 according to the embodiment comprises a casing 22 directly mounted on a compressed air supply pipe 21; a main body casing 23 mounted on the casing 22 by one touch; an adaptor 24 mounted in the interior of the casing 23; a dual head nozzle 25 removably mounted on the adaptor 24; a center cover 26 mounted on the lower surface of the adaptor 24; a liquid sucking pipe 27 mounted on the opening formed on the lower surface of a liquid sucking opening 24a formed in the adaptor 24;

a float 29 provided in the interior of a liquid storing chamber 28, with the center cover 26 serving as the upper surface of the liquid storing chamber 28; a liquid cutoff valve device 30 penetrating from the outside of the casing 23 into the interior of the liquid storing chamber 28; and a liquid cutoff lever 31 mounted on the liquid cutoff valve device 30. The liquid cutoff valve device 30 is connected through a liquid supply pipe 32 to a liquid supply pipe 33.

The casing 22 comprises an approximately semispherical hollow head member 35 and a cylindrical base member 36, the upper surface of which is opened and the lower surface of which is closed. A hook 37 fixed to the base member 36 is rotatably connected to the head member 35 through a pin 38. On the side opposed to the pin 38, a latch 41 comprising a pair of strips 41a and 41b is mounted on metal fittings 39 and 40 fixed to the head member 35 and the base member 36, respectively, so that the head member 35 and the base member 36 are opened and closed by operating the upper strip 41a.

Figure 3:
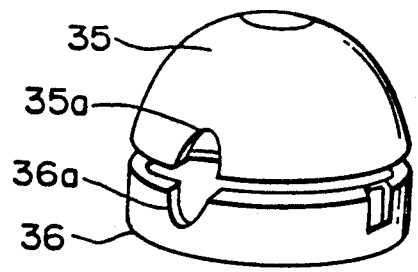
FIG. 3 is a perspective view showing a casing to be installed on a pipe.

As shown in FIG. 3, semispherical through-holes 35a and 36a are formed directed upward on the lower surface of the head member 35 and downward on upper surface of the base member 36, respectively. The semispherical through-holes 35a and 36a are radially opposed to each other to form an opening to allow the sectionally circular pipe 21 to penetrate horizontally therethrough.

Cylindrical portions 35b and 36b, the upper and lower ends of which are open, are formed so that the cylindrical portions 35b and 36b communicate with each other along the axis of the head member 35 and the base member 36. The cylindrical portion 35b has a semispherical lateral opening 35d at the lower end thereof, and the cylindrical portion 36b has also a semispherical lateral opening 36d at the upper end thereof, so that the pipe 21 can be inserted therethrough.

The cylindrical portion 36b of the base member 36 projects upward and downward from the center of a lower closed portion 36c of the base member 36. An air intake member 42 is inserted upwardly from the lower opening of the cylindrical member 36b so that the center of an upper opening of the air intake member 42 coincides with that of the lateral openings 35d and 36d.

A valve cap 44 is mounted on the air intake member 42 by fixing it on the lower peripheral surface of the cylindrical portion 36b by a screw, with a valve assembly 43 installed in the interior of the air intake member 42.

Figure 4:
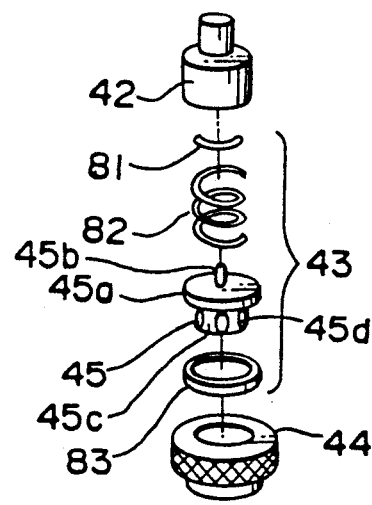
FIG. 4 is partial perspective view showing members for use in the humidifier.

The valve assembly 43 comprises a valve 45, a spring bearing 81, a spring 82, and a rubber packing 83 as shown in FIG. 4. The valve 45 has a projection 45b formed in the center of the upper surface of a disk portion 45a and a cylindrical portion 45c on the lower surface of the disk portion 45a. Air communication openings 45d are formed in the peripheral surface of the cylindrical portion 45c. The upper surface of the disk portion 45a of the valve 45 is urged downward by the spring 82 having its upper end supported by the spring bearing 81 and the valve 45 is inserted into the axial opening of the valve cap 44. For the purpose of providing an air seal, the rubber packing 83 is interposed between the valve cap 44 and the valve 45.

The adaptor 24 is mounted on the valve cap 44 by pressing an air sucking pipe 24i thereof upward into the axial opening of the valve cap 44. The spring 82 holds the valve 45 in the position shown in FIG. 1, and the communication openings 45d project above the rubber packing 83. Thus, compressed air can flow into the air sucking pipe 24i.

As will be described later, in removing the casing 22 from the base member 36, the adaptor 24 is pressed by the compressed air and the spring 82. Consequently, the adaptor 24 can be easily removed from the axial opening of the valve cap 44. In this state, the valve 45 is pressed downward by the compressed air and the spring 82. As a result, the disk portion 45a is brought into close contact with the upper surface of the rubber packing 83, thus reliably closing the path of the compressed air.

Figure 5:
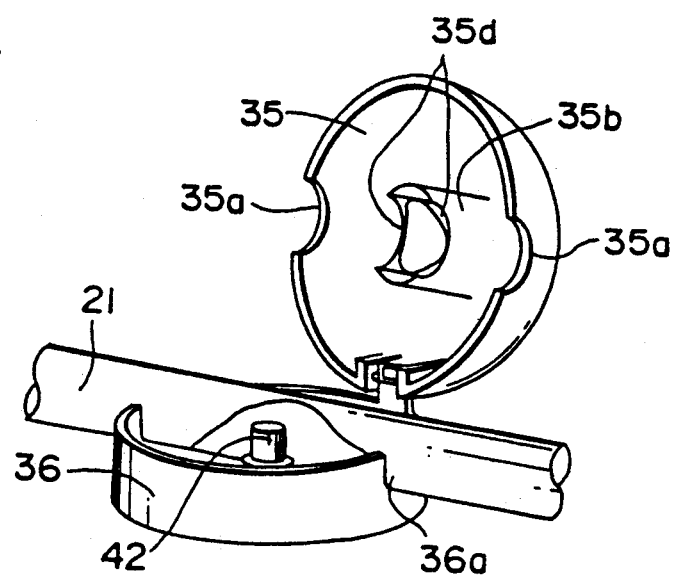
FIG. 5 is a perspective view showing a condition in which the casing of the humidifier is installed on a compressed air supply pipe.

In mounting the casing 22 comprising the head member 35 and the base member 36 directly on the pipe 21, the pipe 21 is horizontally placed on the base member 36 with the head member 35 opened upwardly, and inserted in the opening formed by the semispherical through-holes 35a and 36a and in the lateral opening 35d and 36d as shown in FIG. 5. Then the head member 35a is closed.

An air discharge opening 21a is formed in the pipe 21, and the upper end portion of the air intake member 42 is inserted into the air discharge opening 21a. Thus, the pipe 21 which penetrates through the casing 22 communicates with the air intake member 42.

Then the latch 41 is closed. Thus, the casing 22 is mounted on the pipe 21.

The casing 23 is then removably mounted on the casing 22.

That is, the casing 23 has a double structure comprising an approximately cylindrical inner member 51, the upper end of which is removably fixed to the base member 36 and the bottom surface of which is closed, an outer member 52 closely contacting the peripheral surface of the inner member 51 and a cushion member 53 closely contacting the peripheral surface of the bottom of the inner member 51. The inner member 51, the outer member 52, and the cushion member 53 are held as a unit in close contact with each other.

Figure 6A:
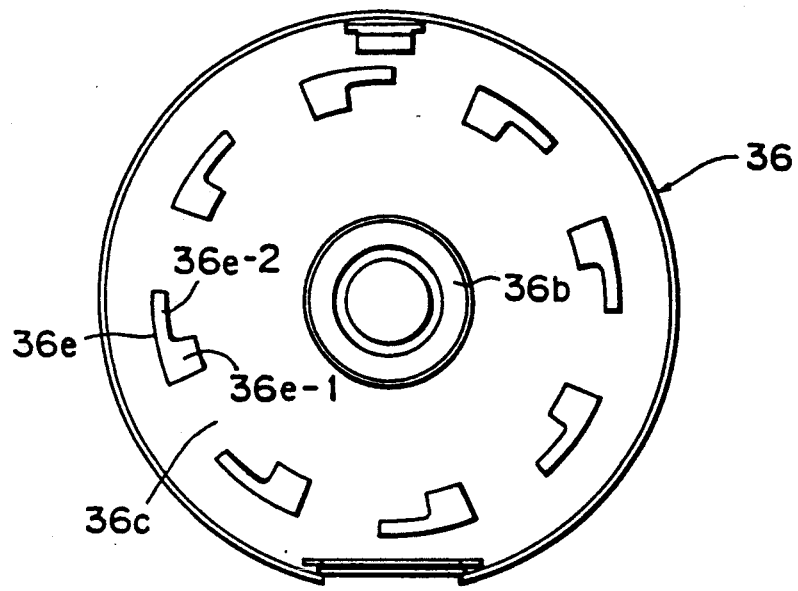
FIG. 6a is a plan view showing the base member of the humidifier.
Figure 6B:
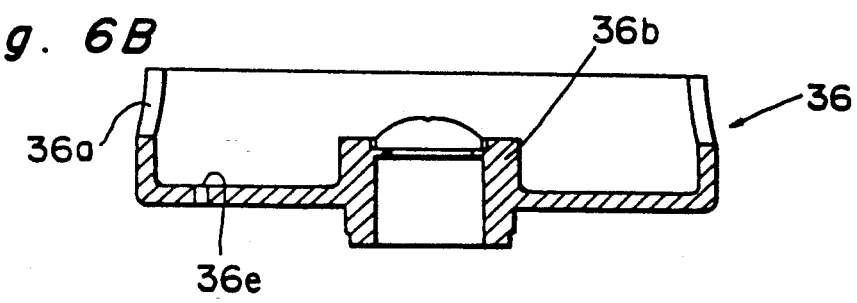

In order to removably mount the casing 23 on the base member 36 with one touch, mounting openings 36e, each having a wide portion 36e-1 and a narrow portion 36e-2, are circumferentially formed at regular intervals on the peripheral surface of the lower closed portion 36c of the base member 36 as shown in FIGS. 6a and 6b. In this embodiment, eight openings 36e are formed. That is, each central angle is 45°.

Eight L-shaped locking pins 54 are circumferentially formed at regular intervals on the upper peripheral surface of the inner member 51. Therefore, each central angle is 45°.

The locking pin 54 is inserted into the opening 36e from the wide portion 36e-1 thereof, and then the base member 36 is rotated to position the locking pin 54 at the narrow portion 36e-2 thereof. Thus, the locking pin 54 is locked by the base member 36. In order to remove the locking pin 54 from the base member 36, the base member 36 is rotated reversely.

Since eight openings 36e and eight locking pins 54 are formed circumferentially, the spraying direction of the nozzle 25 can be selected circumferentially.

The diameter of the inner member 51 becomes a little smaller downward from the upper opening. The bottom wall 51a of the inner member 51 is tapered to the center thereof. The inner member 51 is made of a thin layer of resin, but the peripheral surface of the inner member 51 is covered with the thick outer member 52 and the thick cushion member 53. Therefore, the casing 23 is not easily damaged.

As described previously, the adaptor 24 and the nozzle 25 are mounted in the upper portion inside the inner member 51, and the liquid storing chamber 28 is provided in the lower portion of the inner member 51 with the upper and lower portions partitioned by the center cover 26.

The adaptor 24 is mounted on the valve cap 44 by pressing the air sucking pipe 24i thereof upward into the axial opening of the valve cap 44, fixed to the base member 36 by a screw, and the valve cap 44 is air-sealed through the rubber packing 83. The nozzle 25 is removably mounted on the outer portion of the adaptor 24 by one touch and the center cover 26 is fixed to the lower end portion of the adaptor 24 by a screw.

The casing 23 is removed from the casing 22 with the casing 23 holding the adaptor 24, the nozzle 25, and the center cover 26 as a unit.

Since only one nozzle 25 is provided in this embodiment, for the nozzle 25, an opening 51b is formed on the inner member 51 and an opening 52b is formed on the outer member 52. Therefore, depending on the number of the nozzles 25, a plurality of openings dedicated for the nozzle 25 are formed on the inner member 51 and the outer member 52.

Figure 7:
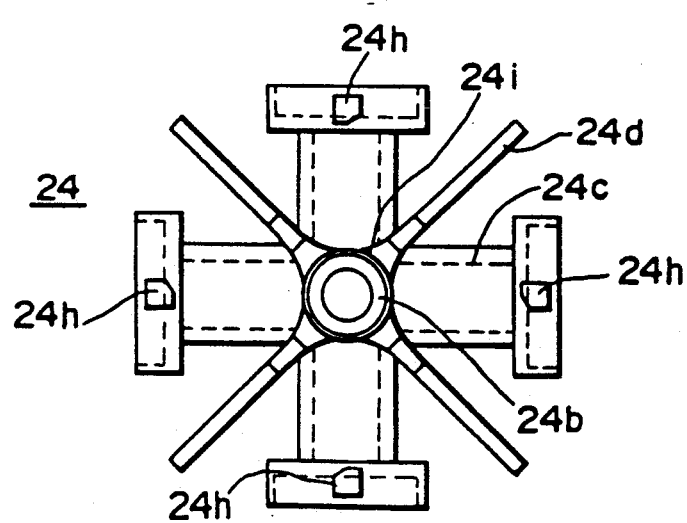
FIG. 7 is a plan view showing an adaptor.

As shown in FIG. 7, the adaptor 24 has a nozzle mounting portion 24c extending crosswise from its axis 24b and a wall partitioning portion 24d extending crosswise therefrom so that each wall partitioning portion 24d is interposed between the nozzle mounting portions 24c.

An air sucking opening 24e communicating with the sucking pipe 24i is provided above the axis 24b of the adaptor 24. The liquid sucking opening 24a communicating with the liquid sucking pipe 27 at the lower opening thereof is provided below the axis 24b of the adaptor 24. The air sucking opening 24e and the liquid sucking opening 24a communicate with an air path 24f and a liquid path 24g, respectively formed on each nozzle mounting portion 24c.

Figure 8A:
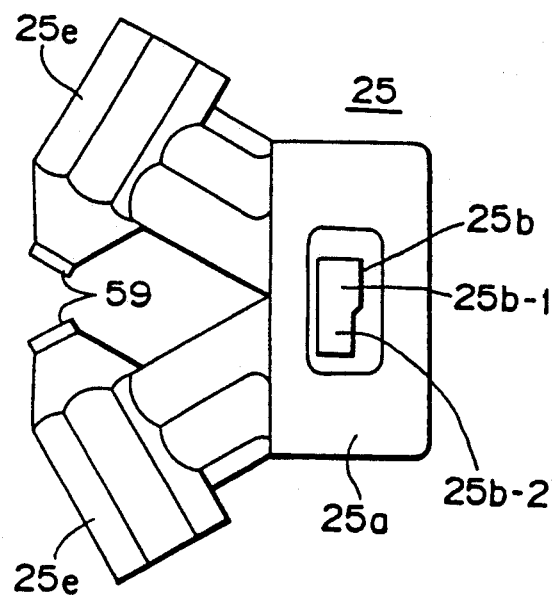
FIG. 8a is a plan view showing a nozzle.
Figure 8B:
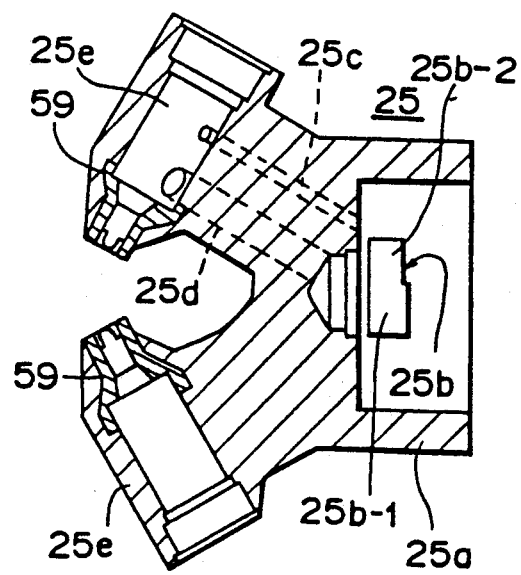

A nozzle locking projection 24h is formed on the upper and lower surfaces of each nozzle mounting portion 24c at the leading end thereof. As shown in FIGS. 8a and 8b, a locking opening 25b is formed on the upper and lower surfaces of a cylindrical body 25a of the nozzle 25. The locking opening 25b has a wide portion 25b-1 and a narrow portion 25b-2.

Therefore, the nozzle mounting portion 24c is pressed into the cylindrical body 25a from the leading end thereof and the projection 24h is inserted into the wide portion 25b-1 and then rotated to be positioned at the narrow portion 25b-2. Thus, the nozzle 25 is installed on the adaptor 24 by one touch. The nozzle 25 is rotated reversely to remove it from the adaptor 24.

The nozzle 25 is constructed as shown in FIGS. 1, 8a, and 8b. That is, compressed air and water introduced from the air path 24f of the adaptor 24 and the liquid path 24g thereof flow through an air path 25c and a liquid path 25d branching in the body 25a of the nozzle 25, thus mixing with each other in each tip mounting portion 25e opposed to each other with a certain angle formed therebetween. The mixture of the compressed air and water is sprayed from a tip 59 mounted on each tip mounting portion 25e.

Compressed air containing droplets atomized by shearing in the liquid path 24g is sprayed from the opening of the nozzle tip 59. Atomized droplets jetted from the opposed openings collide with each other with a certain angle formed therebetween. As a result, ultrasonic wave of 33,000 to 40,000 Hertz is generated to further reduce the size of atomized droplets and make the sizes thereof uniform.

The center cover 26 is fixed to the lower surface of the adaptor 24 with a screw 55. The sucking pipe 27 is inserted into an axial opening formed in the center cover 26 to lock the upper end of the sucking pipe 27. Thus, an opening positioned at the upper end of the sucking pipe 27 communicates with the liquid sucking opening 24a. The peripheral surface of the center cover 26 closely engages the inner peripheral surface of the inner member 51, thus partitioning the liquid storing chamber 28, disposed below the center cover 26, from the exterior.

The sucking pipe 27 extends along the axis of the liquid storing chamber 28 to the vicinity of a bottom wall 51a of the inner member 51. An opening 27a of the sucking pipe 27 at the lower end thereof is spaced at a slight interval from the lowermost portion of the tapered bottom wall 51a. Therefore the sucking pipe 27 sucks liquid in the order from that staying in the lowermost portion of the inner member 51 to that staying upward thereof.

There is a slight gap between the peripheral surface of the float 29 positioned in the lower portion of the liquid storing chamber 28 and the inner peripheral surface of the inner member 51 as shown in FIG. 1. The float 29 has an axial opening 29a movable along the axis of the sucking pipe 27 with a slight interval spaced from the sucking pipe 27. An annular projection 29b is formed on the upper end surface of the opening 29a. The leading end of the liquid cutoff lever 31 contacts the upper surface of the projection 29b.

Figure 9:
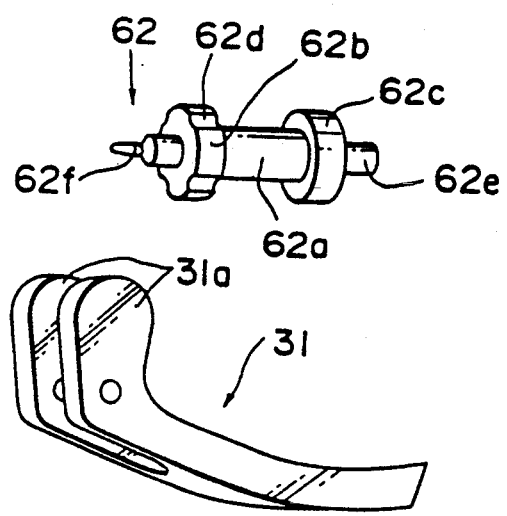
FIG. 9 is a perspective view showing a water cutoff lever and a water cutoff valve for use in a water cutoff valve device.

The liquid cutoff lever 31, comprising a pair of members as shown in FIG. 9, contacts the upper surface of the projection 29b with the sucking pipe 27 sandwiched between the pair of members. The liquid cutoff lever 31 is pivotally fixed to the cap 60 of the liquid cutoff device 30 about a pin 61 so that the liquid cutoff lever 31 pivots according to the upward and downward movements of the float 29.

The other end of the liquid cutoff lever 31 projects from a lateral opening 60b formed on the side surface of the cap 60 into a horizontal valve chamber 60a formed inside the liquid cutoff device 30 so that the other end of the liquid cutoff lever 31 engages a liquid cutoff valve 62 slidably engaging the interior of the valve chamber 60a. That is, as shown in FIG. 9, the liquid cutoff valve 62 has projections 62b and 62c of a large diameter on the front and rear sides of a cylindrical base portion 62a extending horizontally. The other end 31a of the liquid cutoff lever 31 is positioned between the projections 62b and 62c. According to the pivotal motion of the liquid cutoff lever 31, the liquid cutoff valve 62 horizontally moves with the other end 31a of the liquid cutoff lever 31 contacting the projection 62b or the projection 62c.

Figure 10:
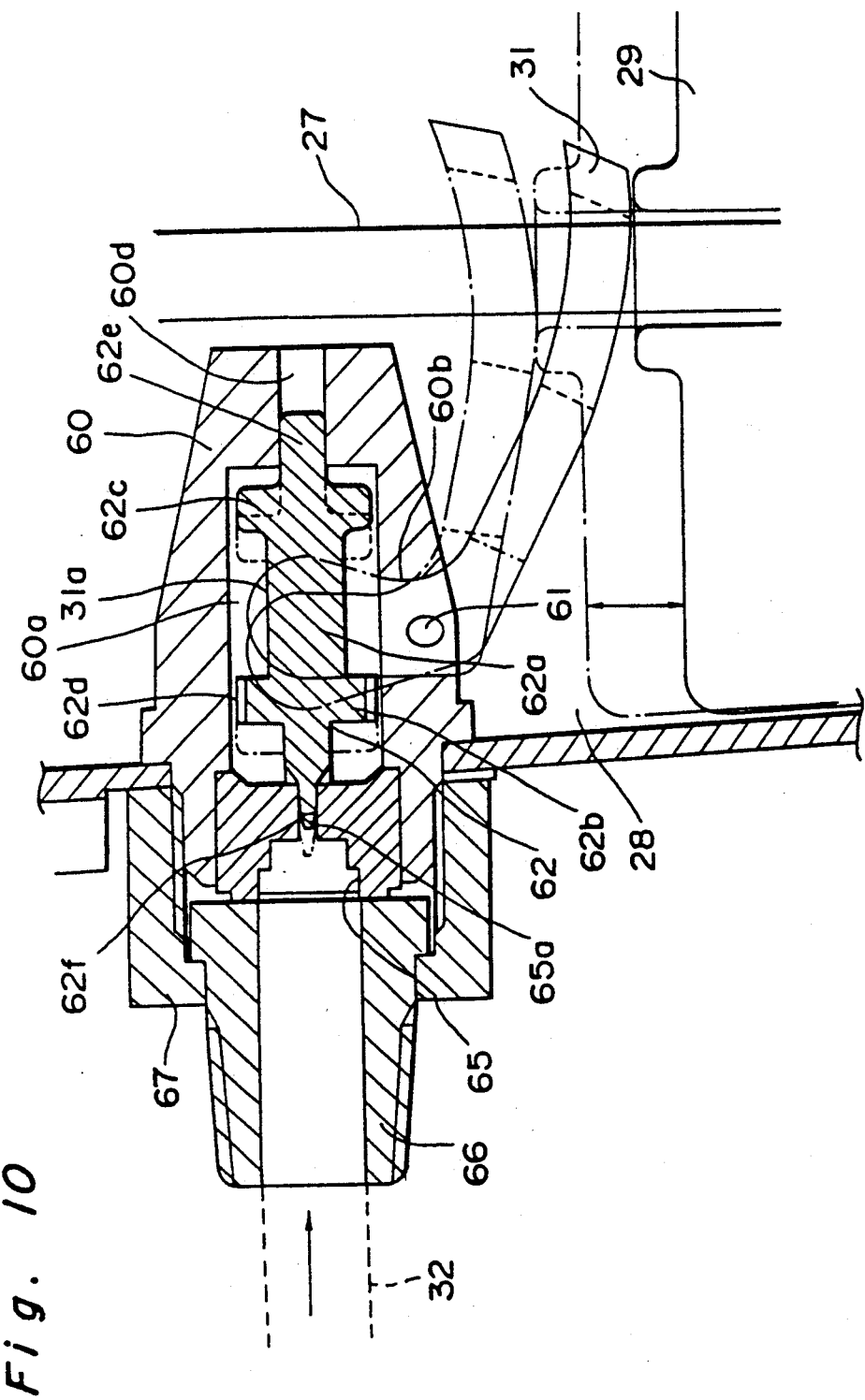
FIG. 10 is a sectional view showing the operation of the water cutoff valve device.
Figure 11:
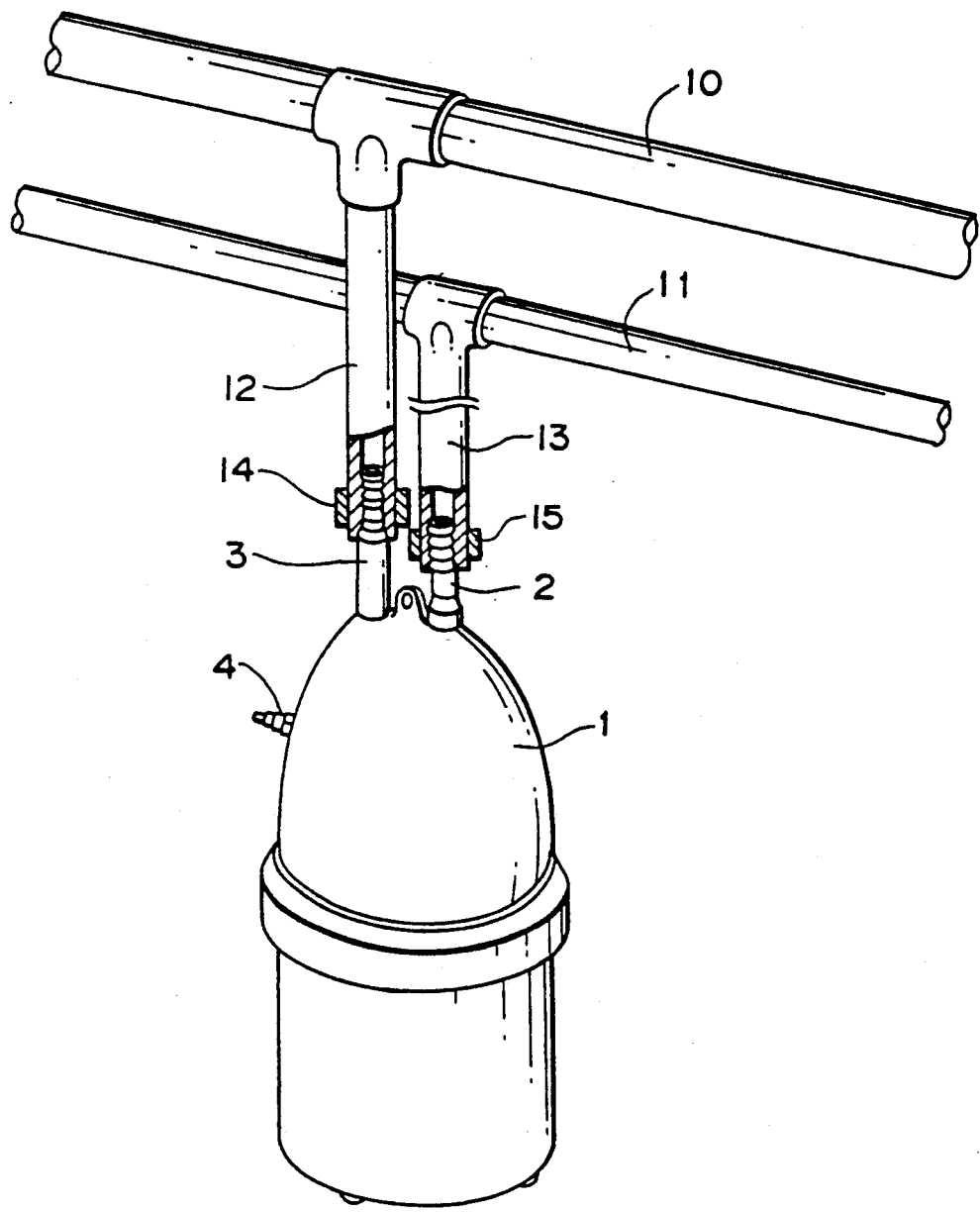
FIG. 11 is a perspective view showing a conventional humidifier.

Referring to FIGS. 1, 9, and 10, cut-outs 62d are formed on the peripheral surface of the projection 62b so that liquid flows from the cut-out 62d into the interior of the liquid cutoff valve 62 is supplied from the lateral opening 60b into the liquid storing chamber 28. The projections 62b and 62c move in sliding contact with the inner peripheral surface of the valve chamber 60a. A small diameter shaft 62e provided on the leading end of the shaft 62a is slidably inserted into a small diameter guide opening 60d provided on the leading end of the valve chamber 60a. Accordingly, the liquid cutoff valve 62 operated by the liquid cutoff lever 31 is adapted to move linearly by means of regulation of the movement direction of the liquid cutoff valve 62.

Referring to FIGS. 9 and 10, a needle valve 62f projecting horizontally from the other end of the shaft 62a of the liquid cutoff valve 62 is inserted into a path 65a formed in a rubber valve 65 inserted into the cap 60. The needle valve 62f opens and closes the path 65a according to the movement of the liquid cutoff valve 62. That is, when the float 29 is positioned at the lowermost level through the liquid cutoff lever 31, the liquid cutoff valve 62 is moved to the position shown by a solid line. Thus, the needle valve 62f opens the path 65a. When the float 29 is positioned at the uppermost level, the liquid cutoff valve 62 is moved to the position shown by a one-dot chain line. Thus, the needle valve 62f closely contacts the peripheral surface of the path 65a of the rubber valve 65, thus closing the path 65a. The maximum capacity of the liquid storing chamber 28 is as small as 30 cc when the float 29 is at the uppermost position.

On the mounting side of the rubber valve 65, an adaptor 66 for supplying liquid to the cap 60 is connected with the cap 60 by means of a mounting member 67 and connected with the liquid supply pipe 33 via the pipe 32 with a one touch type clamping tool (not shown) so as to introduce liquid into the humidifier.

The liquid cutoff valve device 30 projects into the liquid storing chamber 28 through mounting openings 51c and 52c formed in the inner member 51 and the outer member 52, respectively, and is installed on the casing 23 with the adaptor 66 connected with the cap 60 by means of the mounting member 67.

In the liquid cutoff valve device 30, as described previously, the capacity of the liquid storing chamber 28 is approximately 30 cc at maximum, and the buoyancy of the float 29 is set to be small. But owing to the use of the liquid cutoff lever 31, the buoyancy of the float 29 is increased at the rate of 3.5:1. That is, the liquid cutoff lever 31 acts on the liquid cutoff valve 62. Thus, torque can be obtained with a small buoyancy.

Liquid supplied into the liquid storing chamber 28 flows from the upper surface of the float 29 into the gap between the peripheral surface there and the inner peripheral surface of the inner member 51, thus flowing into the gap provided on the tapered bottom surface of the inner member 51. Then the liquid is sucked upward by the sucking pipe 27 from the center of the bottom surface of the inner member 51. Thus, the liquid circulates.

A drain opening portion 51d is formed in the center of the bottom wall 51a of the inner member 51 and threaded on the inner surface thereof. The drain opening portion 51d is inserted into a drain opening 53a formed in the cushion member 53 and connected with a pipe 71 having a drain cock 70 formed thereon.

Therefore, when the humidifier is not used for a long time, the drain cock 70 is opened to discharge liquid stored in the liquid storing chamber 28.

The inner member 51 of the casing 23 and the center cover 26 are molded with a black resin so as to absorb light so as to prevent the generation of bacteria.

As described previously, the head member 35 of the casing 21 is semispherical and the peripheral surface of the casing 23 is slightly tapered toward its bottom, so that the casing 23 is not covered with dust.

Figure 2:
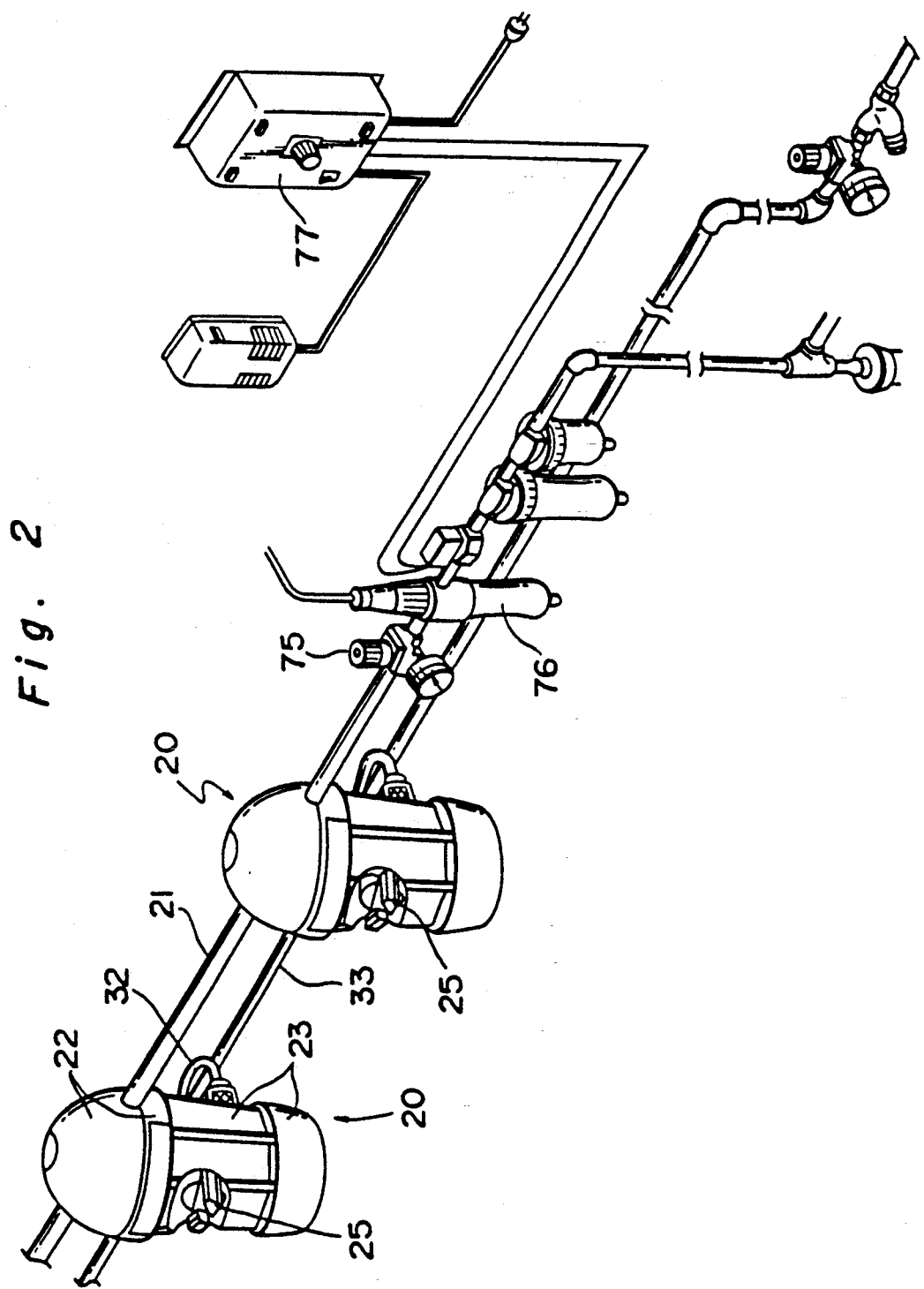
FIG. 2 is a perspective view showing an example of the humidifier of FIG. 1 installed in a room.

According to the humidifier of the above construction, as shown in FIG. 2, a plurality of humidifiers 20 are mounted on the pipe 21 installed along the ceiling of a room, spaced at predetermined intervals and connected with the liquid supply pipe 33 via the adaptor 66 of the liquid cutoff device 30 and the pipe 32.

The pipe 21 is connected with a compressed air supply source through a pressure reducing valve 75, an air filter 76, and a control box 77. The liquid supply pipe 33 is connected with waterworks through a pressure reducing valve, an air filter (not shown), and a control box (not shown).

The operation of the humidifier of the above construction is described below.

In spraying atomized droplets, compressed air is supplied from the pipe 21 and introduced into the air intake member 42 of each humidifier 20. The compressed air which has flowed inside the air intake member 42 flows into the air sucking opening 24e of the adaptor 24 through the opening 45d of the valve 45.

Compressed air which has flowed into the adaptor 24 flows into the air paths 25c of the nozzle 25 through each air path 24f.

Liquid (water) is sucked upward by the sucking pipe 27 from the center of the bottom of the liquid storing chamber 28 to the liquid sucking opening 24a of the adaptor 24. Then, the liquid flows into the liquid paths 25d of the nozzle 25 through the liquid path 24g.

In the nozzle 25, the compressed air and the liquid are mixed with each other and droplets are atomized by the compressed air and the nozzle 25 of the configuration described previously. Then, very fine atomized droplets are sprayed from the opening of the nozzle tip 59. The pressure of the compressed air and that of the liquid are set in a range from 0 to 10 kg/cm$^2$ and 0 to 5 kg/cm$^2$, respectively.

In spraying atomized droplets, liquid is sucked upward from the center of the bottom surface of the liquid storing chamber 28. Liquid flows from the periphery of the float 29 to the center of the tapered bottom surface of the liquid storing chamber 28. Therefore, liquid introduced into the liquid storing chamber 28 earlier is sprayed before liquid introduced thereinto later.

When the float 29 moves downward with the decrease of liquid stored in the liquid storing chamber 28, the liquid cutoff lever 31 pivots, thus moving the liquid cutoff valve 62. Thus, the liquid path 65a of the rubber valve 65 is opened to introduce liquid into the liquid storing chamber 28.

Figure 12:
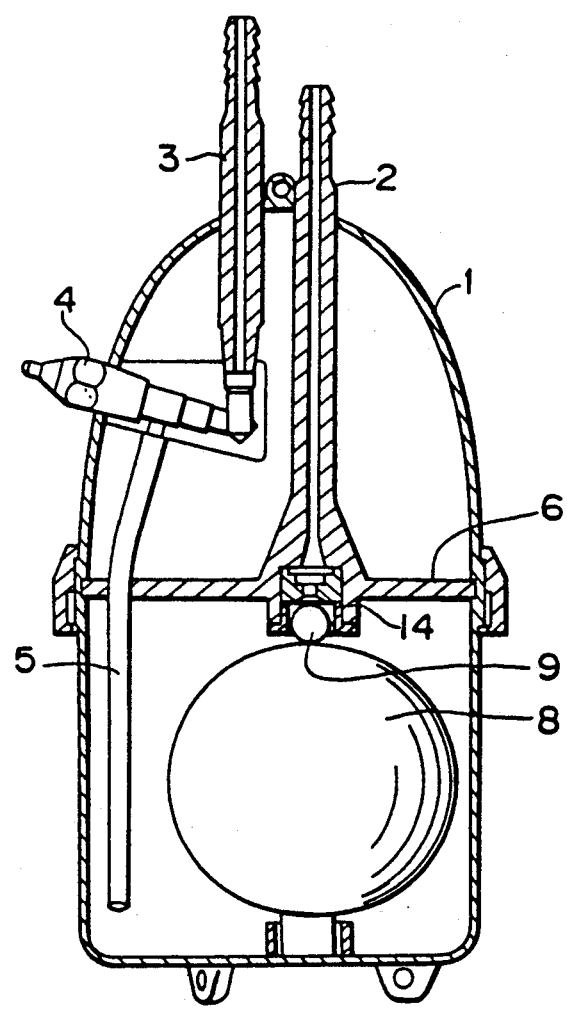
FIG. 12 is a sectional view showing the humidifier shown in FIG. 11.

When the float 29 moves upward as a result of the introduction of liquid into the liquid storing chamber 28, the liquid cutoff lever 31 pivots reversely, thus stopping the flow of liquid. As described previously, according to this embodiment, the capacity of the liquid storing chamber 28 is 30 cc, which is 1/10 to 1/7 of the amount of the liquid storing chamber of the conventional humidifier described previously with reference to FIG. 12. Since the capacity of the storing chamber 28 is so small that the float 29 moves upward and downward when atomized droplets are sprayed, thus operating the water cutoff lever 31 and the liquid cutoff valve 62, water is supplied intermittently to supply fresh liquid to the liquid storing chamber 28.

The float 29, the water cutoff lever 31, and the water cutoff valve 62 operate stably and accurately. That is, the float 29 moves straight upward and downward with the center thereof guided by the sucking pipe 27 and the peripheral surface thereof guided by the inner peripheral surface of the inner member 51. When the liquid cutoff valve 62 is moved by the liquid cutoff lever 31, the liquid cutoff valve 62 is regulated to move linearly and the needle valve 62d opens and closes the path of the rubber valve 65. Consequently, the needle valve 62d closely contacts the peripheral surface of the path 65a of the rubber valve 65, and thus the water supply can be reliably stopped.

In the maintenance of the humidifier, the casing 23 can be removed from the casing 22 by rotating the casing 23 and pulling it therefrom. At this time, since the adaptor 24 is urged by the pressure of compressed air and the spring 82, the adaptor 24 can be easily pulled from the valve cap 44.

When the adaptor 24 has been removed from the valve cap 44, the valve 45 is pressed downward by compressed air and the spring 82, and consequently the valve disk 45a closely contacts the rubber packing 83. As a result, the valve 45 is automatically closed. Therefore, when the casing 23 is removed from the casing 22, it is unnecessary to suspend the supply of compressed air.

After the casing 23 is removed from the casing 22, the pipe 32 is disconnected from the mounting member 66. The pipe 32 and the mounting member 66 connected with each other by means of a one touch type clamping tool can be disconnected from each other by one touch.

The casing 23 is removed from the casing 22 with the casing 23 holding the adaptor 24, the nozzle 25, the float 29, and the liquid cutoff device 30. These require maintenance and inspection and are thus removed as a unit. In order to install these members 24, 25, 29, and 30 in the casing 23 after maintenance and inspections are performed, the locking pin 54 is inserted into the mounting opening 36d of the base member 36 and rotated reversely.

Thus, the casing 23 can be installed on the casing 22 by rotating it with one hand. Therefore, the casing 23 can be easily installed on the casing 22 and removed therefrom at a high position.

The present invention is not limited to the above-described embodiment. If the humidifier is not required to be mounted on the pipe 21, but if it is desired to be hung, a T-shaped pipe is mounted on the pipe 21 and the leading end of the longitudinal axis of the T-shaped pipe is opened to be connected with a pipe positioned above the humidifier.

As described above, according to the humidifier of the present invention, the capacity of the liquid storing chamber is made to be a lowest amount possible, namely, 1/9 to 1/7 of the amount of the liquid storing chamber of a conventional humidifier. In addition, in spraying atomized liquid, liquid introduced into the liquid storing chamber earlier is sprayed before liquid introduced thereinto later, while liquid is being intermittently supplied thereto. Further, if the humidifier is not used for a long time, liquid stored in the liquid storing chamber is discharged. Therefore, the generation and breeding of bacteria can be almost completely prevented.

According to the liquid cutoff mechanism for not storing liquid more than a predetermined amount in the liquid storing chamber, the capacity of the tank and the size of the float are made to be compact for preventing the generation of bacteria. Therefore, a great buoyancy cannot be obtained as it is, but the liquid cutoff lever is used to increase the buoyancy so as to obtain a great torque. A desired torque can be easily obtained by setting the distance between the fulcrum of the liquid cutoff lever and both ends thereof to a desirable distance.

Furthermore, since the float, the liquid cutoff lever, and the liquid cutoff valve are capable of stably and accurately operating, a stabilized liquid cutoff operation can be obtained.

In addition, according to the humidifier, members which require maintenance can be installed on the casing directly mounted on the compressed air supply pipe and removed therefrom by one touch.

Further, the humidifier can be directly mounted on the compressed air supply pipe and the liquid supply pipe, the humidifier can be installed in a small space and the humidifier can be manufactured with a smaller number of necessary members. Furthermore, the members which require maintenance can be held in a stabilized condition.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A humidifier comprising:
   a casing, said casing having a partition separating said casing into an upper portion and a lower portion;
   a liquid storage chamber provided in said lower portion of said casing;
   a nozzle provided in said upper portion of said container;
   an adaptor provided in said upper portion of said casing having a compressed air inlet and a liquid suction opening, said adaptor fluidly communicating both said inlet and said opening with said nozzle;
   a liquid suction pipe communicating with said liquid suction opening of said adaptor and extending downwardly into said liquid storage chamber toward the bottom surface of said liquid storage chamber;
   a float provided in said liquid storage chamber so as to be vertically moveable therein along with the rise and fall of liquid stored therein, said float having a vertically extending opening therein through which said liquid suction pipe passes so as to guide said float;
   a liquid cutoff device mounted in said casing for cutting off liquid supplied to said liquid storage chamber, said liquid cutoff device including a liquid cutoff valve; and
   a liquid cutoff lever connected to said liquid cutoff valve for operation thereof, said liquid cutoff lever contacting the upper surface of said float.

2. The humidifier of claim 1, wherein a small gap is between said float and said liquid storage chamber such that said liquid storage chamber guides said float in vertical movement thereof.

3. The humidifier of claim 1, wherein the bottom surface of said casing tapers downwardly to the center thereof, said liquid suction pipe opening at the lowermost portion of the bottom surface of said casing.

4. The humidifier of claim 1, wherein:
   said liquid cutoff valve comprises a cap defining a valve chamber therein mounted in said casing at an opening thereof and a valve member having a needle valve for opening and closing said opening and a pair of spaced projections on said valve member, said valve member being disposed in said valve chamber for linear horizontal movement; and said liquid cutoff lever: comprises a pair of members sandwiching said liquid suction pipe at one end thereof, is pivotally mounted on said cap, and has the other end thereof projecting inside said valve chamber and positioned between said spaced projections on said valve member for linear movement thereof in response to pivotal movement of said lever caused by vertical movement of said float.

5. The humidifier of claim 1, wherein said liquid storage chamber has a capacity in the range of 10 cc to 50 cc.

6. The humidifier of claim 1, wherein said casing comprises:
a first casing section including a head member and a base member and a pipe mounting assembly on said head member and said base member such that said first casing section can be mounted on a compressed air supply pipe with the pipe sandwiched between said head and base members, said base member having a plurality of mounting openings; and
a second casing section having a plurality of locking pins projecting from an upper end surface thereof engaging said mounting openings to removably mount said second casing on said first casing.

7. The humidifier of claim 6, and further comprising an air intake member on said base member or communication with the compressed air pipe, said air intake having a valve therein, wherein said adaptor has an air suction pipe with said compressed air inlet thereon, air suction pipe being inserted into said air intake member, holding open said valve in said air intake member.

8. A humidifier comprising:
a casing, said casing having a partition separating said casing into an upper portion and a lower portion;
a liquid storage chamber provided in said lower portion of said casing;
a nozzle provided in said upper portion of said container;
an adaptor provided in said upper portion of said casing having a compressed air inlet and a liquid suction opening, said adaptor fluidly communicating both said inlet and said opening with said nozzle;
a liquid suction pipe communicating with said liquid suction opening of said adaptor and extending downwardly into said liquid storage chamber toward the bottom surface of said liquid storage chamber;
a float provided in said liquid storage chamber so as to be vertically moveable therein along with the rise and fall of liquid stored therein;
a liquid cutoff device mounted in said casing for cutting off liquid supplied to said liquid storage chamber, said liquid cutoff device including a liquid cutoff valve; and
a liquid cutoff lever connected to said liquid cutoff valve for operation thereof, said liquid cutoff lever contacting the upper surface of said float;
wherein said casing comprises a first casing section including a head member and a base member and a pipe mounting assembly no said head member and said base member such that said first casing section can be mounted on a compressed air supply pipe with the pipe sandwiched between said head and base members, said base member having a plurality of mounting openings, and a second casing section having a plurality of locking pins projecting from an upper end surface thereof engaging said mounting openings to removably mount said second casing on said first casing.

9. A humidifier comprising:
a casing, said casing having a partition separating said casing into an upper portion and a lower portion;
a liquid storage chamber provided in said lower portion of said casing;
a nozzle provided in said upper portion of said container;
an adaptor provided in said upper portion of said casing having a compressed air inlet and a liquid suction opening, said adaptor fluidly communicating both said inlet and said opening with said nozzle;
a liquid suction pipe communicating with said liquid suction opening of said adaptor and extending downwardly into said liquid storage chamber toward the bottom surface of said liquid storage chamber;
a float provided in said liquid storage chamber so as to be vertically moveable therein along with the rise and fall of liquid stored therein;
a liquid cutoff device mounted in said casing for cutting off liquid supplied to said liquid storage chamber, said liquid cutoff device including a liquid cutoff valve; and
a liquid cutoff lever connected to said liquid cutoff valve for operation thereof, said liquid cutoff lever contacting the upper surface of said float;
wherein an air intake member is provided in said casing for communication with the compressed air pipe, said air intake having a valve therein, said adaptor having an air suction pipe with said compressed air inlet thereon, and said air suction pipe being inserted into said air intake member, holding open said valve in said air intake member.

10. A humidifier comprising:
a casing, said casing having a partition separating said casing into an upper portion and a lower portion;
a liquid storage chamber provided in said lower portion of said casing;
a nozzle provided in said upper portion of said container;
an adaptor provided in said upper portion of said casing having a compressed air inlet and a liquid suction opening, said adaptor fluidly communicating both said inlet and said opening with said nozzle;
a liquid suction pipe communicating with said liquid suction opening of said adaptor and extending downwardly into said liquid storage chamber toward the bottom surface of said liquid storage chamber;
a float provided in said liquid storage chamber so as to be vertically moveable therein along with the rise and fall of liquid stored therein;
a liquid cutoff device mounted in said casing for cutting off liquid supplied to said liquid storage chamber, said liquid cutoff device including a liquid cutoff valve; and
a liquid cutoff lever connected to said liquid cutoff valve for operation thereof, said liquid cutoff lever contacting the upper surface of said float;
wherein said liquid cutoff valve comprises a cap defining a valve chamber therein mounted in said casing at an opening thereof and a valve member having a needle valve for opening and closing said opening and a pair of spaced projections on said valve member, said valve member being disposed in said valve chamber for linear horizontal movement; and wherein said liquid cutoff lever comprises: a pair of members sandwiching said liquid suction pipe at one end thereof, is pivotally mounted on said cap, and has the other end thereof projecting inside said valve chamber and positioned between said spaced projections on said valve member for linear movement thereof in response to pivotal movement of said lever caused by vertical movement of said float.

* * * * *